United States Patent
Tobari et al.

(10) Patent No.: US 8,305,019 B2
(45) Date of Patent: Nov. 6, 2012

(54) TORQUE CONTROLLER FOR PERMANENT MAGNET SYNCHRONOUS MOTOR

(75) Inventors: Kazuaki Tobari, Hitachiota (JP); Shigehisa Aoyagi, Hitachi (JP); Kentaro Oi, Hitachinaka (JP)

(73) Assignee: Hitachi Car Engineering Co., Ltd., Hitachinaka-shi (JP)

( * ) Notice: Subject to any disclaimer, the term of this patent is extended or adjusted under 35 U.S.C. 154(b) by 304 days.

(21) Appl. No.: 12/708,352

(22) Filed: Feb. 18, 2010

(65) Prior Publication Data

US 2010/0231148 A1  Sep. 16, 2010

(30) Foreign Application Priority Data

Mar. 12, 2009  (JP) ................... 2009-058840

(51) Int. Cl.
*H02P 21/14* (2006.01)
(52) U.S. Cl. .............. 318/400.02; 318/432; 318/767; 318/727; 318/807; 318/38
(58) Field of Classification Search ............. 318/400.02, 318/432, 700, 727, 767, 807
See application file for complete search history.

(56) References Cited

U.S. PATENT DOCUMENTS

| | | | | |
|---|---|---|---|---|
| 6,339,308 B2* | 1/2002 | Shinnaka | ...................... | 318/701 |
| 6,700,400 B2* | 3/2004 | Atarashi | ................... | 318/400.01 |
| 6,940,250 B2* | 9/2005 | Nishimura et al. | ........... | 318/705 |
| 7,560,896 B2* | 7/2009 | Tobari et al. | .................. | 318/807 |
| 7,619,385 B2* | 11/2009 | Suzuki et al. | ................. | 318/705 |
| 2003/0173921 A1 | 9/2003 | Nakazawa | | |
| 2004/0036434 A1 | 2/2004 | Chen et al. | | |
| 2005/0046370 A1 | 3/2005 | Gallegos-Lopez et al. | | |

FOREIGN PATENT DOCUMENTS

| | | |
|---|---|---|
| JP | 4-322190 A | 11/1992 |
| JP | 8-308300 A | 11/1996 |
| JP | 10-136699 A | 5/1998 |
| JP | 2001-161099 A | 6/2001 |
| JP | 2003-134843 A | 5/2003 |
| JP | 2003-209996 A | 7/2003 |
| JP | 2004-180441 A | 6/2004 |
| JP | 2006-191721 A | 7/2006 |
| JP | 2006-230119 A | 8/2006 |
| JP | 2007-252052 A | 9/2007 |
| JP | 2008-247108 A | 10/2008 |

OTHER PUBLICATIONS

Japanese Office Action including English language translation dated Apr. 19, 2011 (Six (6) pages).
European Search Report dated Jul. 19, 2010 (Seven (7) pages).

* cited by examiner

*Primary Examiner* — Walter Benson
*Assistant Examiner* — David Luo
(74) *Attorney, Agent, or Firm* — Crowell & Moring LLP

(57) ABSTRACT

When output voltage $V_1$ of an electric power converter reaches a prescribed voltage $V_1^*_{ref}$ a difference between $V_1$ and $V_1^*_{ref}$ is integrated to correct a commanded torque to $\tau o^*$ ($\tau^* = \tau o^* + \Delta \tau$).

7 Claims, 10 Drawing Sheets

US 8,305,019 B2

TORQUE CONTROLLER FOR PERMANENT MAGNET SYNCHRONOUS MOTOR

CLAIM OF PRIORITY

The present application claims priority from Japanese patent application serial No. 2009-058840, filed on Mar. 12, 2009, the content of which is hereby incorporated by reference into this application.

FIELD OF THE INVENTION

The present invention relates to a vector control system for a permanent magnet synchronous motor and, more particularly, to a technology for achieving highly stable torque control at quick response even near a point at which the output voltage of an electric power converter is limited (saturated).

BACKGROUND OF THE INVENTION

The output voltage of an electric power converter in a controller for controlling current supplied to an AC motor by vector control may be limited (saturated). Prior art applicable to this case is described in, for example, Japanese Patent Laid-open No. 2004-180441. Specifically, to prevent the AC motor from generating an overcurrent, a current command for the q-axis in the d-q coordinate system, which is an orthogonal rotational coordinate system, is corrected so that current Id in the d-axis direction becomes 0 and an interfering item of the q-axis, which interferes with the d-axis, is operated.

SUMMARY OF THE INVENTION

With ordinary industrial motors and AC servo motors, a ratio of a voltage drop due to a motor resistance to a DC voltage (several hundreds of volts) supplied to the electric power converter is small. In most cases, therefore, the output voltage of the electric power converter is not limited (saturated) in a low-speed range.

With motors mounted on vehicles, however, the motor resistance and the resistance of the harness that interconnects the electric power converter and motor are relatively large, so a ratio of a voltage drop due to the motor resistance and harness resistance to the DC voltage (several tens of volts) may become large. In this case, the output voltage of the electric power converter may be limited (saturated) even in the low-speed range.

Accordingly, adequate precision cannot be obtained from the calculation in equation (5) described on page 7 in Japanese Patent Laid-open No. 2004-180441 because the resistance R is omitted.

Even if a resistance is included in the equation, calculation precision is lowered in the low-speed range because the resistance changes by 20% to 30% due to the ambient temperature.

An object of the present invention is to provide a torque controller, for a permanent magnet synchronous motor, that is robust against motor constants and can achieve highly precise torque control at quick response.

Another object of the present invention is to provide a torque controller, for a permanent magnet synchronous motor, that can be used in a range in which a DC voltage supplied to the electric power converter is several volts to several hundreds of volts, that is robust against motor constants, and that can achieve highly precise torque control at quick response.

In an aspect of the present invention, when the output voltage of an electric power converter reaches a prescribed voltage, a commanded torque is corrected.

In a preferred embodiment of the present invention, when the output voltage of an electric power converter reaches a prescribed voltage, a difference between the prescribed voltage and the output voltage of the electric power converter is integrated and the integrated value is used to correct a commanded torque.

The preferred embodiment of the present invention can provide a vector controller, for a permanent magnet synchronous motor, that can achieve highly precise torque control at quick response even near a point at which the output voltage of an electric power converter is limited (saturated).

The preferred embodiment of the present invention can also provide a torque controller, for a permanent magnet synchronous motor, that can be applied to both an inexpensive current detecting system and a system from which a position sensor is eliminated.

Other objects and features of the present invention will be clarified in the embodiments described below.

DESCRIPTION OF THE PREFERRED EMBODIMENTS

Embodiments of the present invention will be described below in detail with reference to the drawings.

First Embodiment

Figure 1:
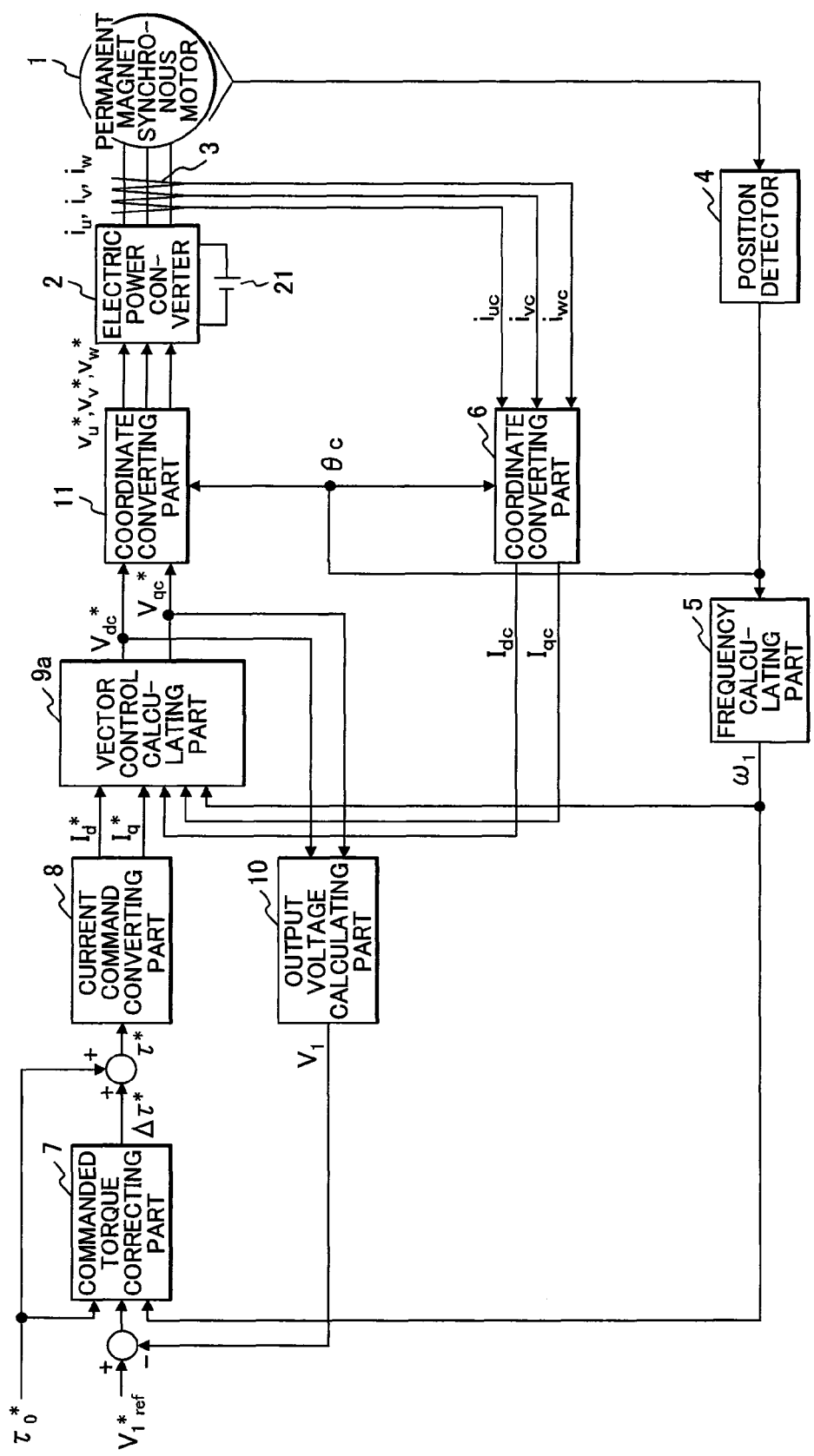
FIG. 1 is a block diagram showing the structure of a torque controller for a permanent magnet synchronous motor in a first embodiment of the present invention.

FIG. 1 is an exemplary block diagram showing the structure of a torque controller for a permanent magnet synchronous motor in a first embodiment of the present invention.

The main circuit in FIG. 1 includes a permanent magnet synchronous motor 1, an electric power converter 2 that outputs voltages in proportion to commanded three-phase voltages Vu*, Vv*, and Vw*, and a DC power supply 21 that supplies a DC voltage. Sensors included in the main circuit are a current detector 3 that detects three-phase AC currents iu, iv, and iw and a position sensor 4 that detects a position θ of the permanent magnet synchronous motor 1 by using a resolver or an encoder.

In the functional section, which is a control circuit, a frequency calculating part 5 generates a calculated frequency $\omega_1$ from a detected positional value θc; a coordinate converting part 6 outputs detected currents Idc and Iqc for the d-axis and q-axis from detected values iuc, ivc, and iwc of the three-phase AC currents iu, iv, and iw and the detected positional value θc of the permanent magnet synchronous motor 1; a commanded torque correcting part 7 calculates a corrected commanded torque Δτ* by using a commanded torque τo* given from a high-end device, a difference between a prescribed voltage $V_1^*{}_{ref}$ and output voltage $V_1$ from the electric power converter 2, and a calculated frequency $\omega_1$; a current command converting part 8 calculates commanded currents Id* and Iq* for the d-axis and q-axis by using the commanded torque τo* given from the high-end device and the corrected commanded torque Δτ*; a vector control calculating part 9a calculates commanded voltages Vdc* and Vqc* for the d-axis and q-axis by using the command currents Id* and Iq* for the d-axis and q-axis, the detected currents Idc and Iqc, and the calculated frequency $\omega_1$, in view of the electric constants of the permanent magnet synchronous motor 1; an output voltage calculating part 10 calculates the output voltage $V_1$ from the electric power converter 2 by using the commanded voltages Vdc* and Vqc* for the d-axis and q-axis; a coordinate converting part 11 calculates the commanded three-phase AC voltages Vu*, Vv*, and Vw*, which the electric power converter 2 should output, according to the commanded voltages Vdc* and Vqc* for the d-axis and q-axis and the detected positional value θc.

Figure 2:
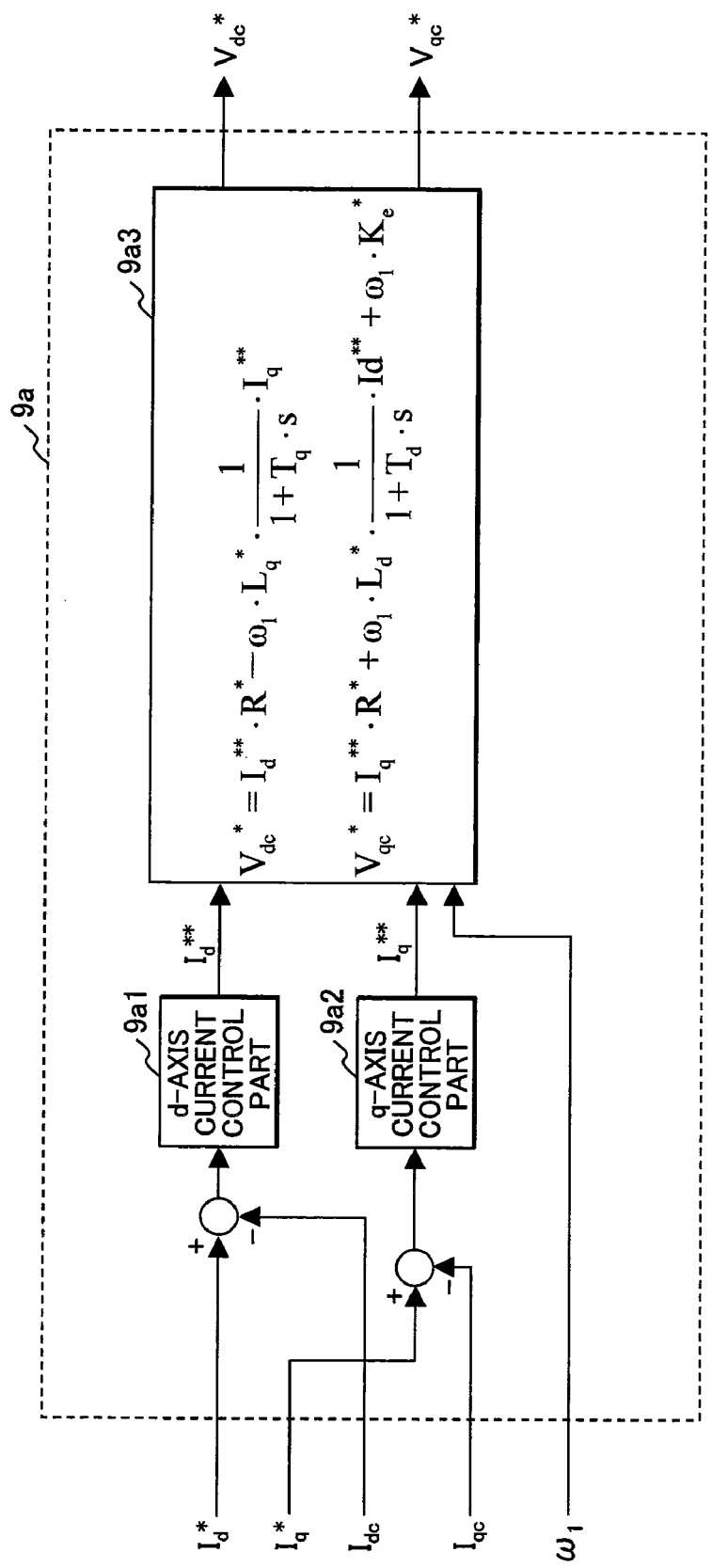
FIG. 2 specifically illustrates a vector control calculating part 9a in the torque controller in FIG. 1.

FIG. 2 specifically illustrates the vector control calculating part 9a applied to the torque controller in FIG. 1.

The d-axis current control part 9a1 in FIG. 2 outputs a second commanded current Id** so that the d-axis detected current Idc matches (follows) the d-axis commanded current Id*. Similarly, the q-axis current control part 9a2 outputs a second commanded current Iq** so that the q-axis detected current Iqc matches (follows) the q-axis commanded current Iq*. The d-axis current control part 9a1 and q-axis current control part 9a2 perform proportional integration or only integration and determine their control gain from a control response angular frequency to be set in current control.

A vector calculating part 9a3 calculates the commanded voltages Vdc* and Vqc* for the d-axis and q-axis by using Id output from the d-axis current control part 9a1 and Iq output from the q-axis current control part 9a2, the calculated frequency col, and motor constants as in equation (1) so as to control the output voltage $V_1$ from the electric power converter 2.

[Equation 1]

$$V_{dc}^* = Id^{**} \cdot R^* - \omega_1 \cdot Lq^* \cdot \frac{1}{1+Tq \cdot s} \cdot Iq^{**}$$
$$V_{qc}^* = Iq^{**} \cdot R^* + \omega_1 \cdot Ld^* \cdot \frac{1}{1+Td \cdot s} \cdot Id^{**} + \omega_1 \cdot Ke^* \quad (1)$$

Where R* is a resistance setting, Ld* is a d-axis inductance setting, Lq* is a q-axis inductance setting, Ke* is an induced voltage constant setting, Tq equals Lq*/R*, Td equals Ld*/R*, and s is a Laplace operator.

The output voltage calculating part 10 calculates the output voltage $V_1$ by using the commanded voltages Vdc* and Vqc*, which are output from the vector control calculating part 9a, as in equation (2).

[Equation 2]

$$V_1 = \sqrt{V_{dc}^{*2} + V_{qc}^{*2}} \quad (2)$$

First, the commanded torque correcting part 7, which is a feature of the present invention, will be described.

Figure 3:
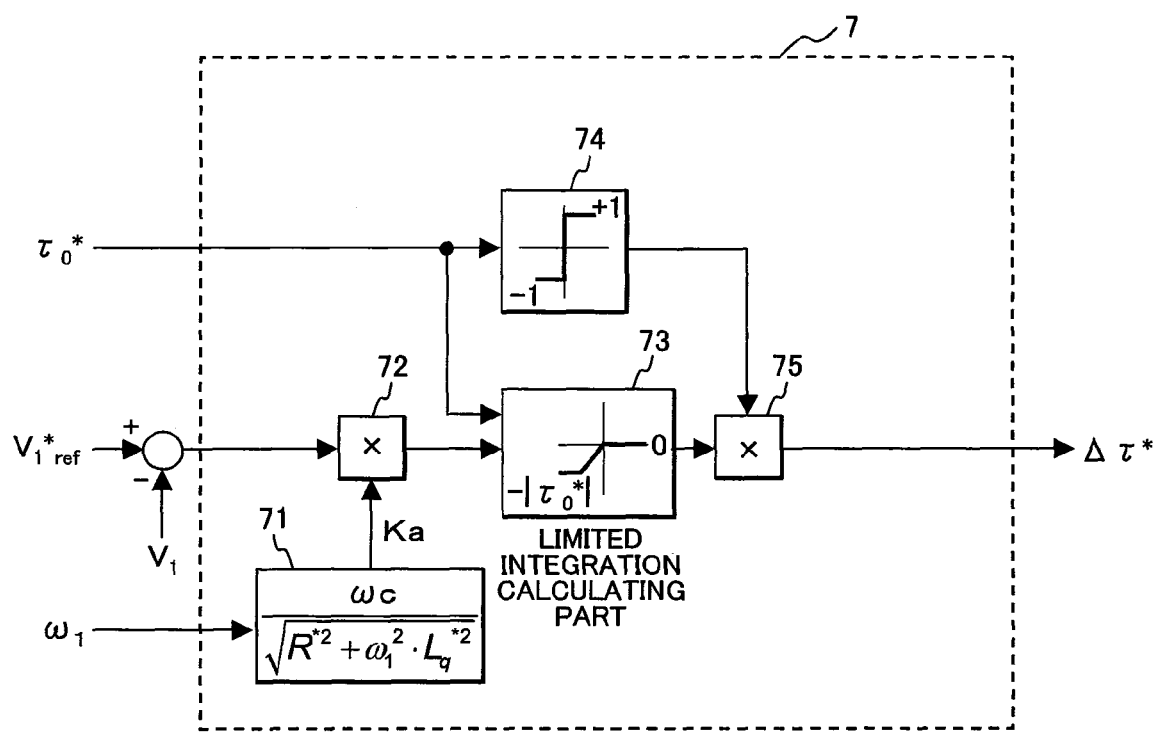
FIG. 3 is a block diagram of a commanded torque correcting part 7 in the torque controller in FIG. 1.

FIG. 3 shows the structure of the commanded torque correcting part 7 in the first embodiment of the present invention. The commanded torque correcting part 7 outputs a compensation amount Δτ* to lower a commanded torque τ* when the output voltage $V_1$ of the electric power converter 2 reaches the prescribed voltage $V_1^*{}_{ref}$.

An integration gain calculating part 71 calculates an integration gain Ka by using the calculated frequency $\omega_1$ and constants (R and Lq) as in equation (3).

[Equation 3]

$$Ka = \frac{\omega c}{\sqrt{R^{*2} + (\omega_1 \cdot L_q^*)^2}} \quad (3)$$

Where ωc is the control response angular frequency, R* is a resistance setting of the motor and harness, and Lq* is the q-axis inductance of the motor.

In equation (3), if the motor or the frequency range satisfies $R^{*2} \ll (\omega_1 L_q^*)^2$, $R^{*2}$ can be omitted in the calculation of equation (3). The commanded torque correcting part 7 is an outer loop of the vector control calculating part 9a, which controls current; the control response angular frequency ωc is preferably about half to one-tenth the control response angular frequency to be set in the current control circuit to obtain stable control.

A multiplier 72 calculates the integration gain Ka, which is output from the integration gain calculating part 71, and the difference between the prescribed voltage $V_1^*{}_{ref}$ and output voltage $V_1$ from the electric power converter 2. The calculation result is output to a limited integration calculating part 73.

The limited integration calculating part 73 performs an integration calculation. In this calculation, positive values are limited to 0, and negative values are limited to a value obtained by multiplying the absolute value of an uncorrected commanded torque τo*, which is given by the high-end device, by −1. That is, correction to the commanded torque τ*, which has a polarity opposite to that of the commanded torque τo* given by the high-end device, does not occur, and thereby an inverted operation is not unintentionally performed.

τo* is also input to a polarity determining part 74. The polarity determining part 74 outputs a polarity signal Sign [τo*], which is +1 or −1, according to equation (4).

[Equation 4]

$$\tau_0^* \geq 0 : \text{Sign}[\tau_0^*] = +1$$
$$\tau_0^* < 0 : \text{Sign}[\tau_0^*] = -1 \quad (4)$$

A multiplier 75 receives an integrated value output from the limited integration calculating part 73 and the polarity signal, which is +1 or −1, output from the polarity determining part 74. These values are used to correct the torque command with the inverted polarity of the commanded torque τo* given by the high-end device. Specifically, the polarity of Δτ* is determined according to equation (5).

[Equation 5]

$$\left.\begin{array}{l}\tau_0^* \geq 0 : \Delta\tau^* \leq 0 \\ \tau_0^* \leq 0 : \Delta\tau^* \geq 0\end{array}\right\} \quad (5)$$

Finally, the corrected commanded torque $\Delta\tau$ is calculated as in equation (6).

[Equation 6]

$$\Delta\tau^* = \frac{K}{s} \cdot (V_{ref}^* - V_1) \cdot S_{ign}[\tau_0^*] \quad (6)$$

In addition, the corrected commanded torque $\Delta\tau^*$ is added to the commanded torque $\tau_0^*$, calculating a new commanded torque $\tau^*$, as in equation (7).

[Equation 7]

$$\tau^* = \tau_0^* + \Delta\tau^* \quad (7)$$

Referring to FIG. 1 again, the current command converting part 8 calculates the commanded currents Id* and Iq* for the d-axis and q-axis by using the commanded torque $\tau^*$, which has been corrected, as in equation (8), and outputs the calculated values.

[Equation 8]

$$\left.\begin{array}{l}Id^* = 0 \\ Iq^* = \dfrac{\tau^*}{K_t}\end{array}\right\} \quad (8)$$

Although Id* is set to 0, if an operation is performed with a weak magnetic field or the maximum torque-to-current ratio, Id* may be a prescribed value rather than 0.

Figure 4:
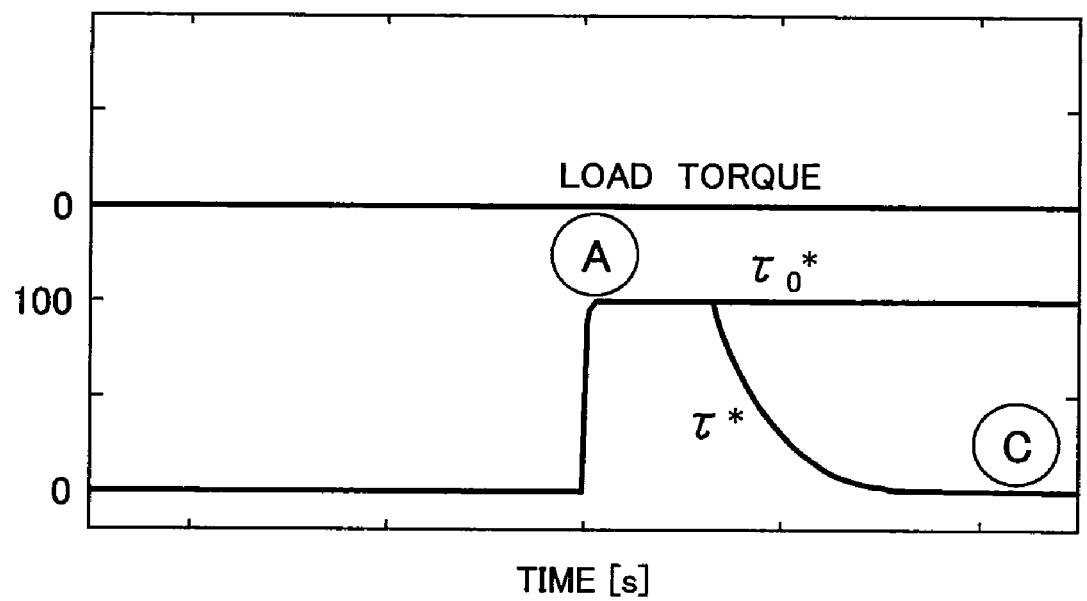
FIG. 4 illustrates control characteristics under no load when a calculation for torque command correction is performed according to the first embodiment.
Figure 4:
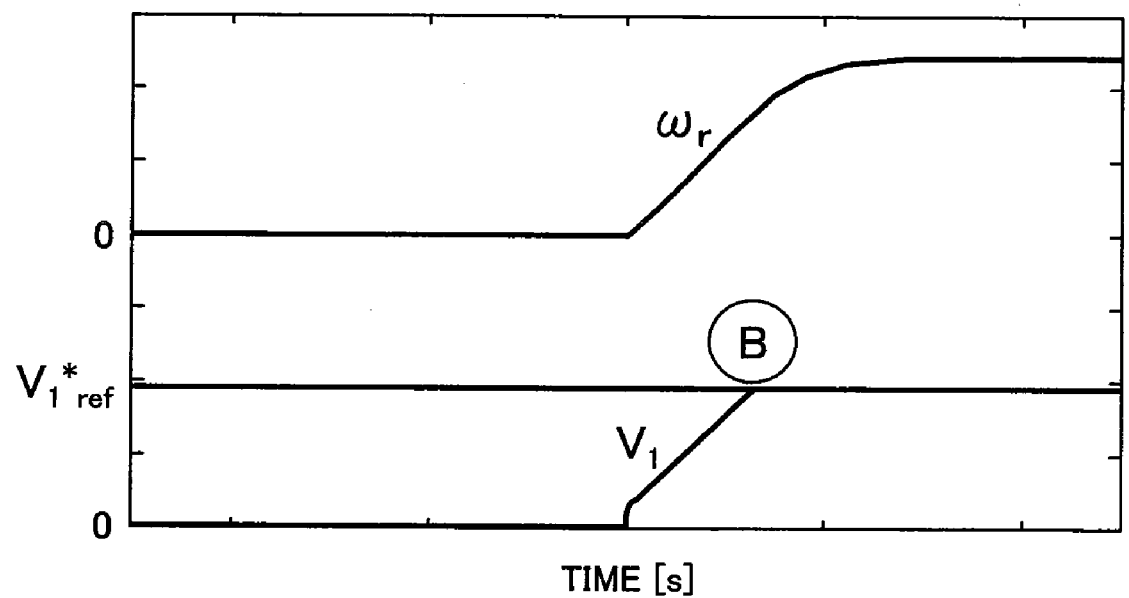

FIG. 4 illustrates control characteristics under no load when a calculation for torque command correction is performed according to the first embodiment. The commanded torque correcting part 7 needs to set the prescribed voltage $V_1^*{}_{ref}$ at which a calculation for torque command correction starts.

When the electric power converter 2 undergoes sine wave modulation, the average of its maximum output voltage is represented by equation (9), so $V_1^*{}_{ref}$ must be set to a value slightly lower than the value calculated according to equation (9).

[Equation 9]

$$\overline{V_{1max}^*} = \frac{3}{4} \cdot Ed \quad (9)$$

The setting must satisfy the relation in equation (10).

[Equation 10]

$$V_1^* ref < \frac{3}{4} \cdot Ed \quad (10)$$

Where Ed is a DC voltage.

When an in-phase signal (a three-fold harmonic component, for example), which is canceled at a line voltage, is superimposed to the commanded three-phase voltages Vu*, Vv*, and Vw*, the average of the maximum output voltage of the electric power converter 2 can be increased. The average of the maximum output voltage is represented by equation (11).

[Equation 11]

$$\overline{V_{1max}^*} = \frac{\sqrt{3}}{2} \cdot Ed \quad (11)$$

The setting must satisfy the relation in equation (12).

[Equation 12]

$$V_1^* ref < \frac{\sqrt{3}}{2} \cdot Ed \quad (12)$$

Effects of the first embodiment will be described next with reference to FIGS. 4 and 5.

When the commanded torque $\tau_0^*$ is given from the high-end device at point A in time, the rotational speed $\omega r$ of the permanent magnet synchronous motor 1 increases and the motor generates an induced voltage, increasing the output voltage $V_1$ from the electric power converter 2.

The output voltage $V_1$ reaches the prescribed voltage $V_1^*{}_{ref}$ at point B in time, so correction of $\tau^*$ starts at that time.

Since there is no load at time C in time, $\tau^*$ is corrected to approximately 0 and $\omega r$ is fixed at a constant value, indicating that a stably controlled operation is achieved.

Operation continues in this state. When a load torque $\tau L$ is applied at point D in time, $\omega r$ drops. However, a torque $\tau m$ is generated by an amount equal to $\tau L$, indicating that a stably controlled operation is achieved at a point above the equivalent point of the N-T (rotational speed-torque) characteristics.

In the first embodiment, the integration gain Ka is calculated in the integration gain calculating part 71 according to equation (3) so that the response time of the commanded torque correcting part 7 becomes constant regardless of the rotational speed $\omega r$ of the motor. However, in a case (or an application) in which the output voltage $V_1$ may cause a slight overshoot or the response time may be delayed, the integration gain Ka may be a constant value.

Since, in the first embodiment, the output voltage $V_1$ is used to correct the commanded torque $\tau^*$, if the resistance R changes, $V_1$ is affected by the change; the larger the resistance R is, the larger $V_1$ is. This indicates that since $V_1$, which is affected by a change in the resistance R, is controlled, the torque controller is robust against the resistance R.

Even if the resistance R, which is used in integration gain calculation according to equation (3), slightly changes, quick response is slightly lowered but stability is not largely affected.

Figure 6:
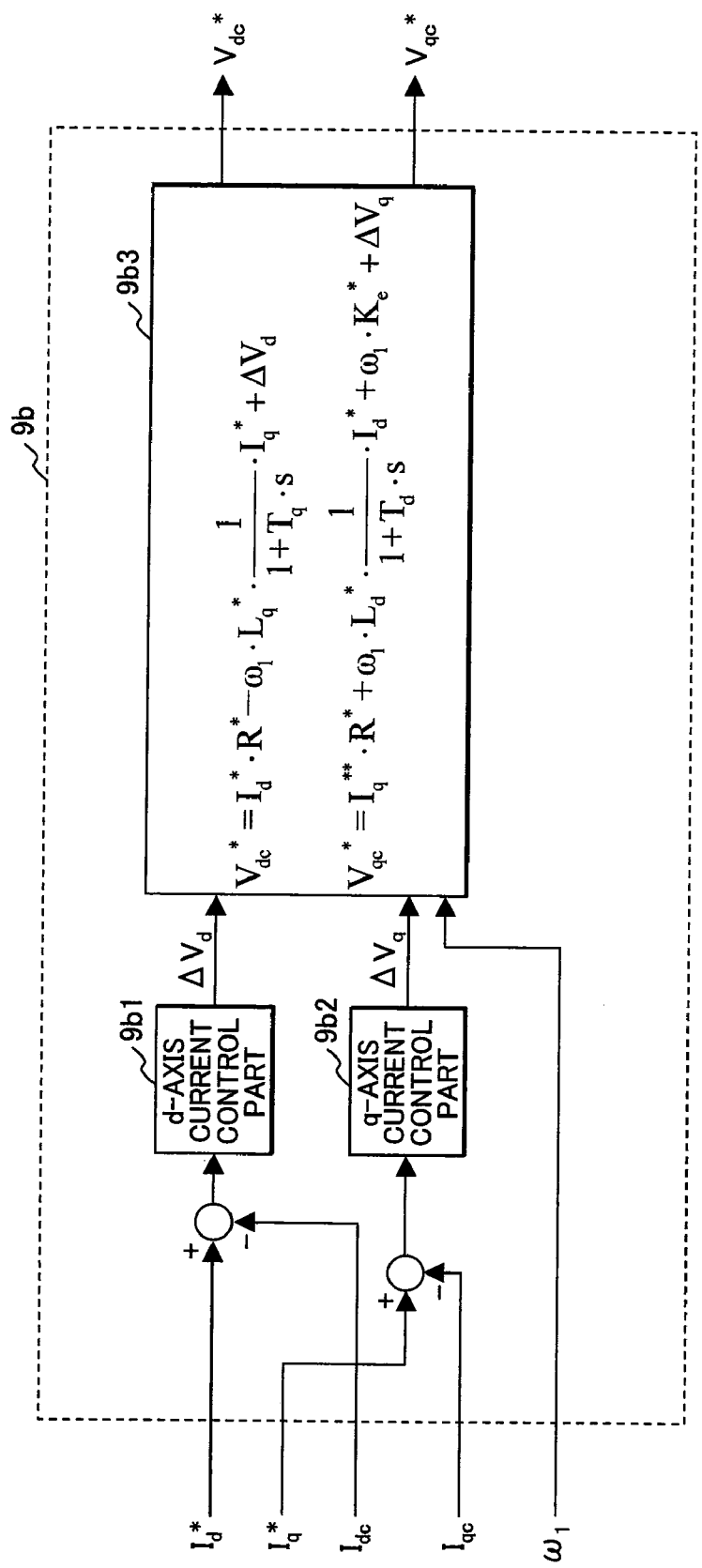
FIG. 6 illustrates another vector control calculation part 9b.

Although the vector control calculating part 9a has been used in the first embodiment, the vector control calculation part 9b shown in FIG. 6 may be used instead.

The d-axis current control part 9b1 outputs a compensated voltage $\Delta Vd$ so that the d-axis detected current Idc matches (follows) the d-axis commanded current Id*. Similarly, the q-axis current control part 9b2 outputs a compensated voltage $\Delta Vq$ so that the q-axis detected current Iqc matches (follows) the q-axis commanded current Iq*. The d-axis current control part 9b1 and q-axis current control part 9b2 perform proportional integration or only integration and determine their control gain from a control response angular frequency to be set in current control. A vector calculating part 9b3 calculates the commanded voltages Vdc* and Vqc* for the d-axis and q-axis by using ΔVd and ΔVq output from the current control parts 9b1 and 9b2, the calculated frequency $\omega_1$, and the motor constants as in equation (13) so as to control the output voltage $V_1$ from the electric power converter 2.

[Equation 13]

$$V_{dc}^* = Id^* \cdot R^* - \omega_1 \cdot Lq^* \cdot \frac{1}{1+Tq \cdot s} \cdot Iq^* + \Delta V_d \qquad (13)$$
$$V_{qc}^* = Iq^* \cdot R^* + \omega_1 \cdot Ld^* \cdot \frac{1}{1+Td \cdot s} \cdot Id^* + \omega_1 \cdot Ke^* + \Delta Vq$$

Figure 7:
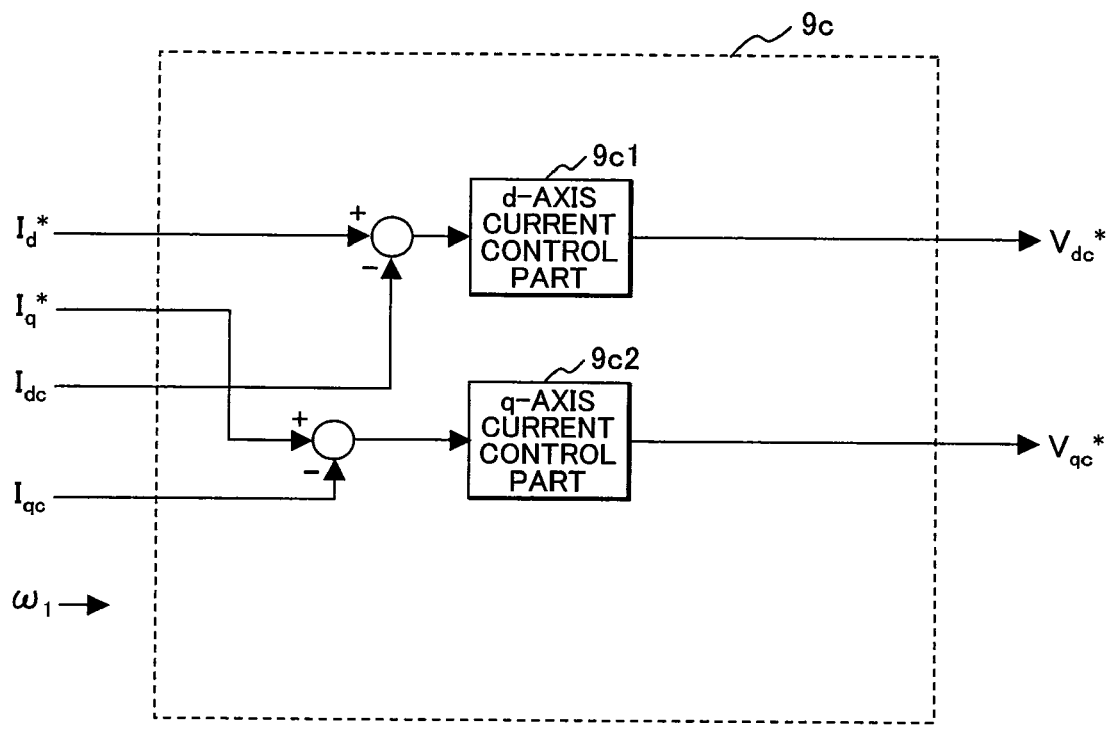
FIG. 7 illustrates still another vector control calculation part 9c.

A vector control calculation part 9c shown in FIG. 7 may be used instead of the vector control calculation parts 9a and 9b.

The d-axis current control part 9c1 outputs the d-axis commanded voltage Vdc* so that the d-axis detected current Idc matches (follows) the d-axis commanded current Id*. Similarly, the q-axis current control part 9c2 outputs the q-axis commanded voltage Vqc* so that the q-axis detected current Iqc matches (follows) the q-axis commanded current Iq*. The d-axis current control part 9c1 and q-axis current control part 9c2 perform proportional integration or only integration and determine their control gain from a control response angular frequency to be set in current control. The d-axis commanded voltage Vdc* and the q-axis commanded voltage Vqc* are used to control the output voltage $V_1$ from the electric power converter 2.

Calculations in the vector control calculation parts 9b and 9c, as described above, can provide the same effect as in the vector control calculation part 9a.

Second Embodiment

Figure 8:
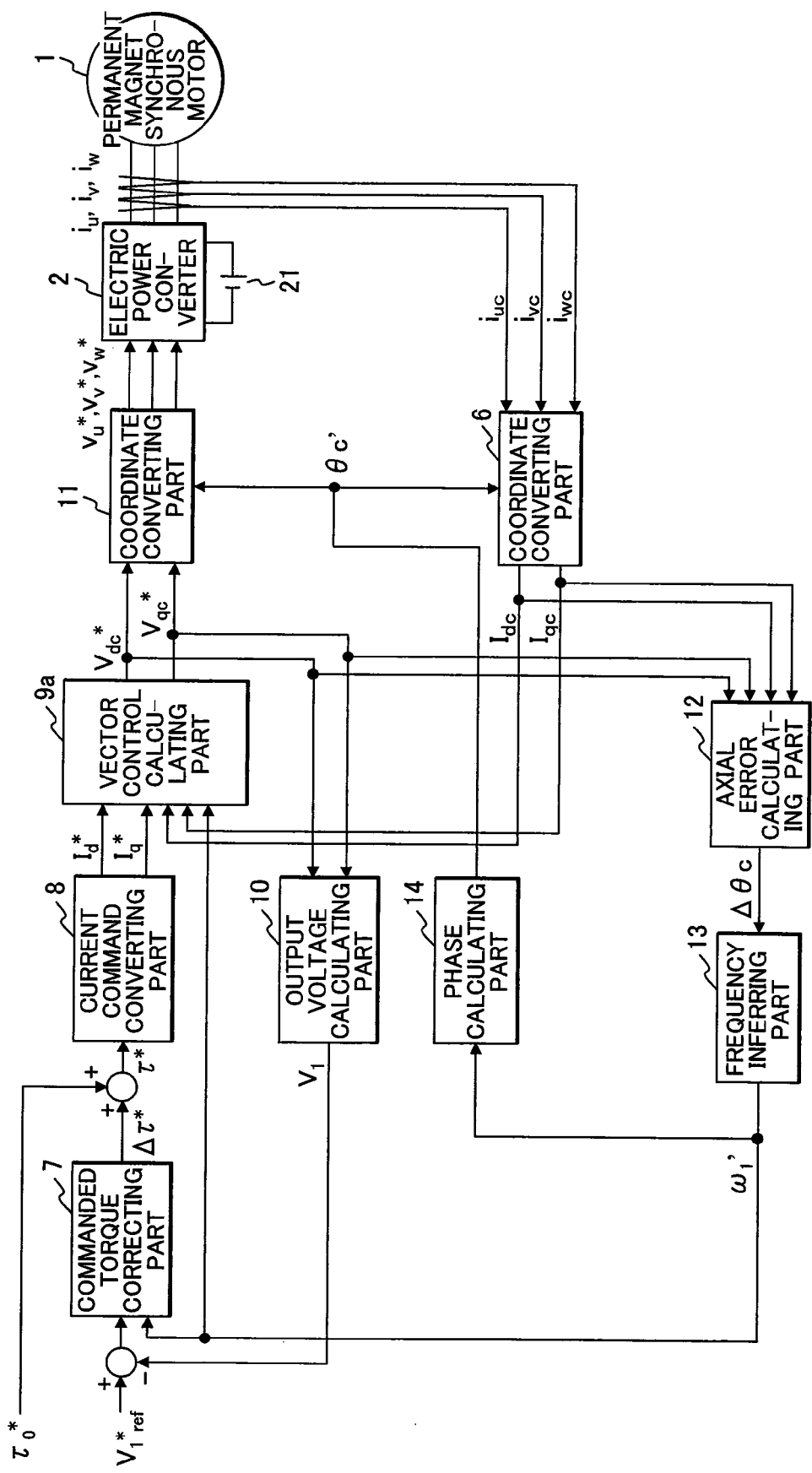
FIG. 8 is a block diagram showing the structure of a torque controller for a permanent magnet synchronous motor in a second embodiment of the present invention.

FIG. 8 is a block diagram showing the structure of a torque controller for a permanent magnet synchronous motor in a second embodiment of the present invention.

This embodiment is applied to a torque controller from which a position sensor such a resolver or an encoder is eliminated. In FIG. 8, the same components as in FIG. 1 are denoted by the same reference characters. An axial error calculating part 12 infers an axial error $\Delta\theta c$ (=θc'−θ), which is a difference between an inferred phase value θc' and motor phase value θ by using the d-axis commanded voltage Vdc*, the q-axis commanded voltage Vqc*, the detected currents Idc and Iqc, an inferred frequency $\omega_1'$, and the motor constants, as in equation (14).

[Equation 14]

$$\Delta\theta c = \tan^{-1}\left[\frac{Vdc^* - R^* \cdot Idc + \omega_1' \cdot Lq^* \cdot Iqc}{Vqc^* - R^* \cdot Iqc - \omega_1' \cdot Lq^* \cdot Idc}\right] \qquad (14)$$

A frequency inferring part 13 calculates the inferred frequency $\omega_1'$ so that the calculated axial error Δθc becomes 0. A phase calculating part 14 integrates the inferred frequency $\omega_c'$ to calculate the inferred phase value θc'.

Even in an inexpensive control system of this type, in which a position sensor is eliminated, it is clear that the same operation as in the first embodiment is achieved and the same effect can be obtained.

Although the vector control calculating part 9a is used in the second embodiment, the use of the vector control calculating part 9b or 9c described in the first embodiment can provide the same effect as in the second embodiment.

Third Embodiment

Although the expensive current detector 3 is used in the first and second embodiments to detect the three-phase AC currents iu, iv, and iw, the present invention can also be applied to a torque controller that detects currents in an inexpensive manner.

Figure 9:
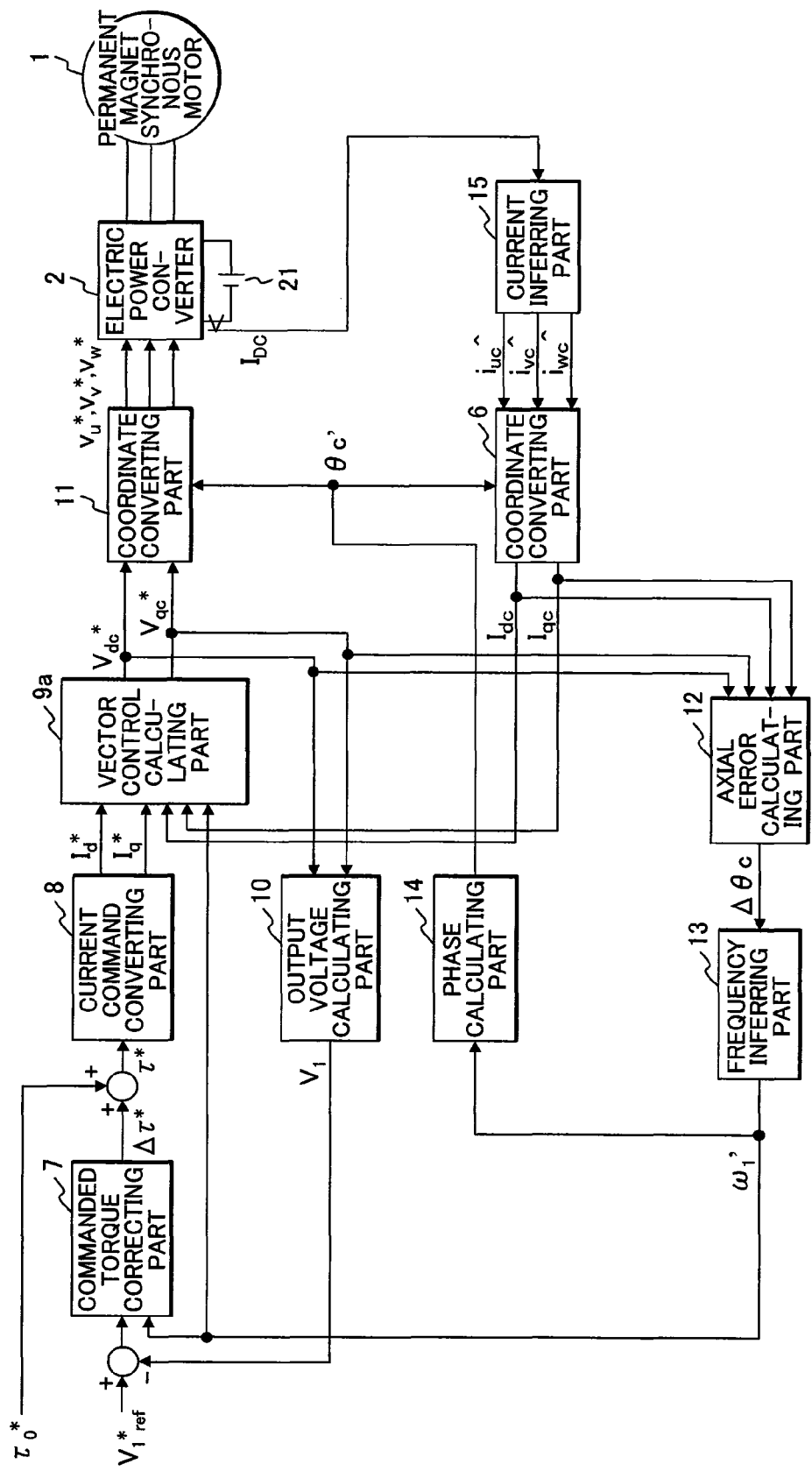
FIG. 9 is a block diagram showing the structure of a torque controller for a permanent magnet synchronous motor in a third embodiment of the present invention.

FIG. 9 shows the structure of a torque controller in a permanent magnet synchronous motor according to a third embodiment of the present invention, the torque controller detecting currents as described above. In FIG. 9, the same components as in FIG. 8 are denoted by the same reference characters. A current inferring part 15 infers the three-phase currents iu, iv, and iw, which flow in the permanent magnet synchronous motor 1, from a DC current $I_{DC}$ flowing in the input bus of the electric power converter 2.

The coordinate converting part 6 uses inferred currents iû, iv̂, and iŵ to calculate the detected currents Idc and Iqc for the d-axis and q-axis.

Even in an inexpensive control system of this type, in which a current sensor is eliminated, it is clear that the same operation as in the first embodiment can be achieved and the same effect can be obtained.

Although the vector control calculating part 9a is used in the third embodiment, the use of the vector control calculating part 9b or 9c described in the first embodiment provides the same effect as in the third embodiment.

Figure 10:
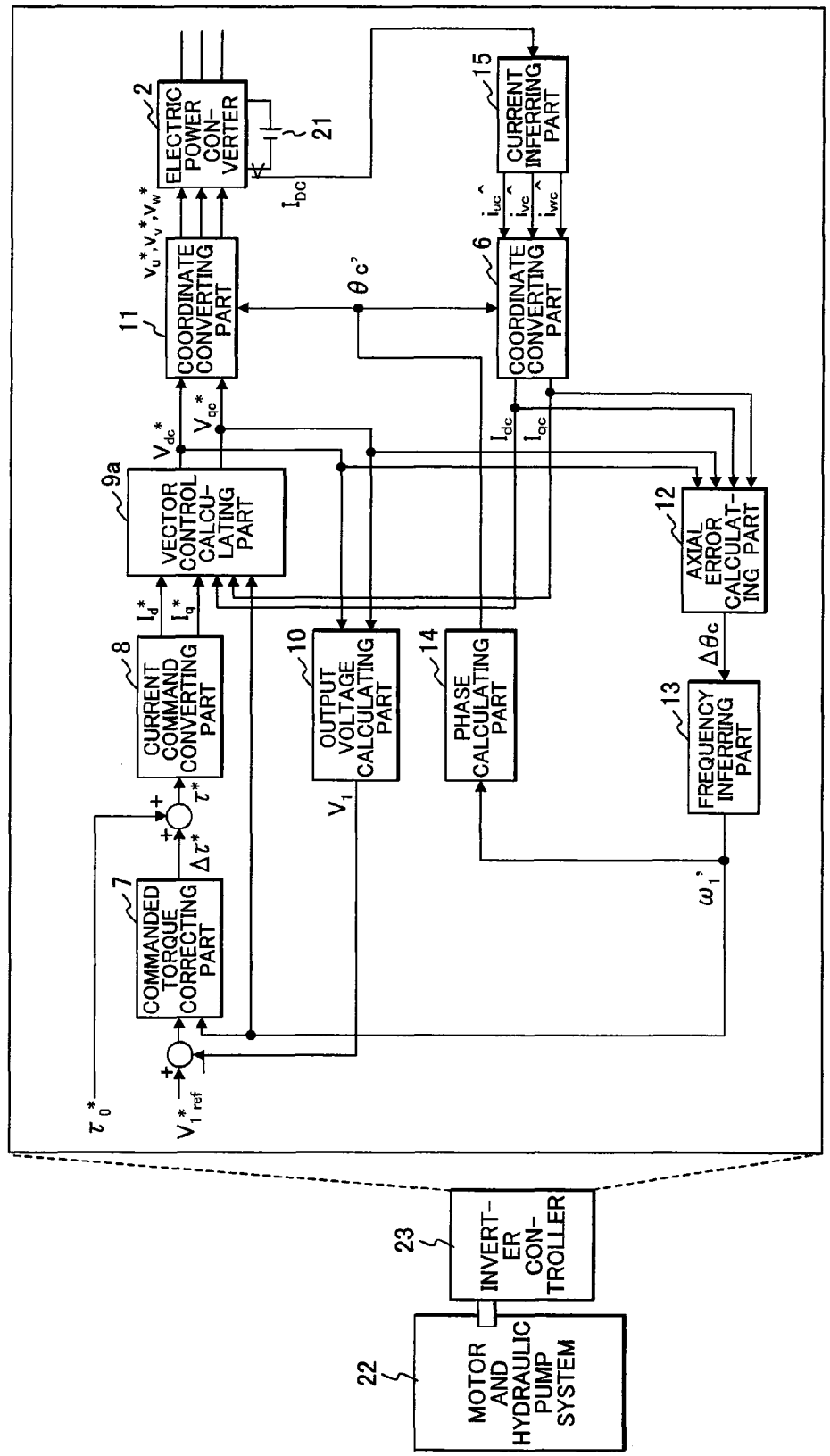
FIG. 10 is a block diagram showing the structure of a torque controller for a permanent magnet synchronous motor when the present invention is applied to an electric hydraulic pump system.

FIG. 10 is a block diagram showing the structure of a torque controller for a permanent magnet synchronous motor when the present invention is applied to an electric hydraulic pump system.

In this example, the third embodiment of the present invention is applied to an electric hydraulic pump system mounted on a vehicle.

In FIG. 10, the same components as in FIG. 9 are denoted by the same reference characters.

A hydraulic pump system 22, which includes the permanent magnet synchronous motor 1, is driven by an inverter controller 23.

The components denoted by reference characters 2, 6 to 8, 9a, 10 to 15, and 21 in FIG. 10 are implemented by software and hardware circuits.

When the third embodiment of the present invention is applied to a hydraulic pump system as described above, quick-response and high-precision control characteristics can be achieved.

Although the third embodiment is used in this example, the first or second embodiment may be used instead. Furthermore, even when the vector control calculating part 9b or 9c described in the first embodiment may be used instead of the vector control calculating part 9a, the same effect as in this example can be obtained.

With the torque controller for a permanent magnet synchronous motor that embodies the present invention, when the output voltage of the electric power converter 2 reaches the prescribed voltage $V_1*_{ref}$, a motor torque or motor current is generated according to the load torque.

Figure 5:
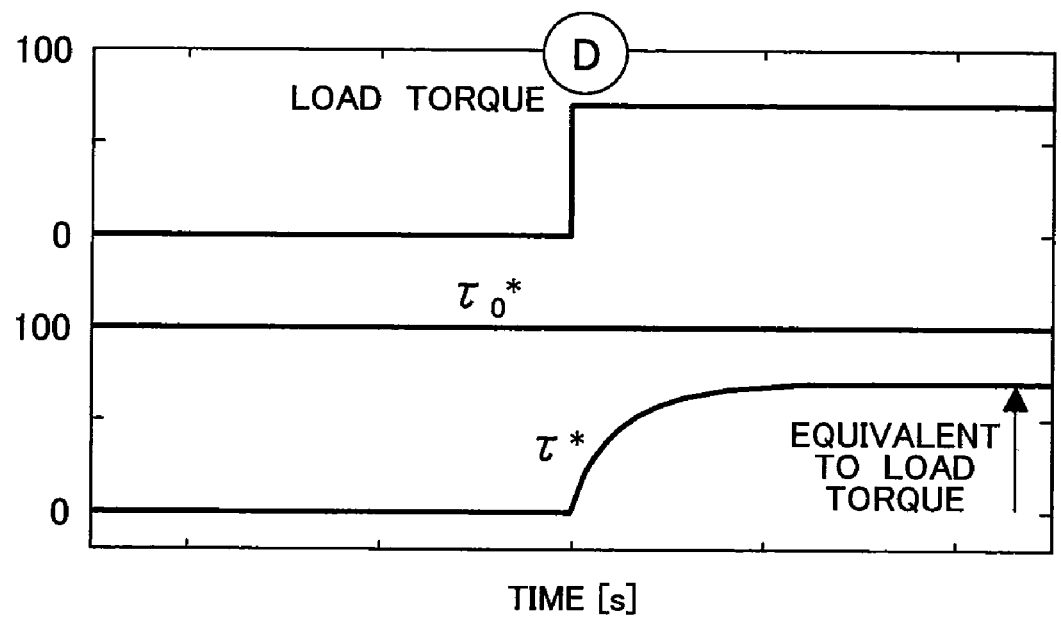
FIG. 5 illustrates control characteristics under load when a calculation for torque command correction is performed according to the first embodiment.
Figure 5:
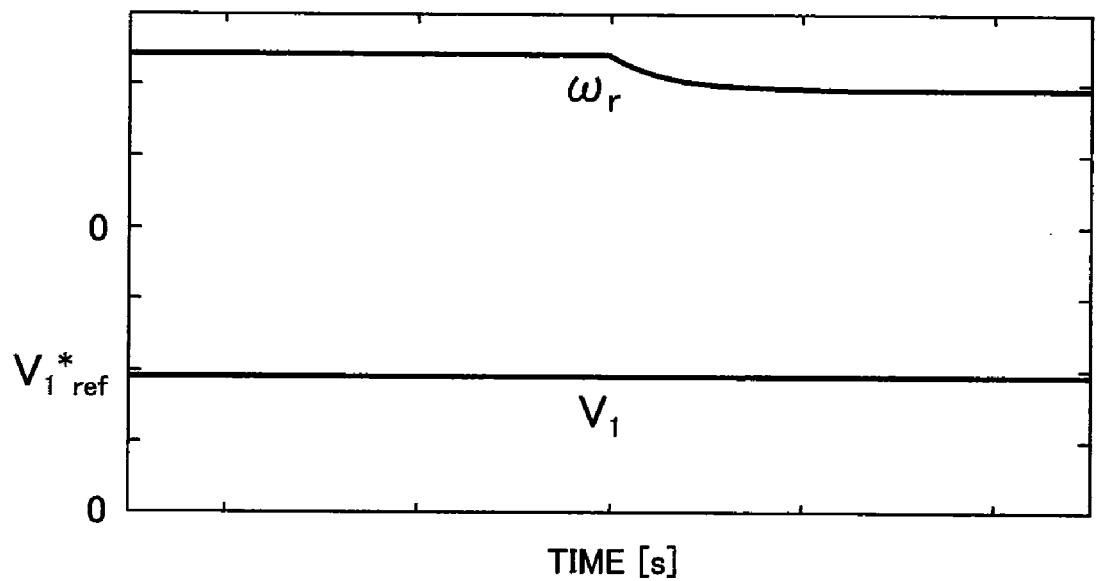

From the control characteristics according to the first embodiment, shown in FIGS. 4 and 5, it is found that when there is no load torque, a new commanded torque τ* converges to 0 and that when there is a load torque, the new commanded torque τ* becomes equivalent to the load torque.

According to the embodiments described above, a vector controller for a permanent magnet synchronous motor can achieve highly precise torque control at a quick response even near a point at which the output voltage of an electric power converter is limited (saturated).

In addition, a torque controller for a permanent magnet synchronous motor that can be applied to both an inexpensive current detecting system and a system from which a position sensor is eliminated can be provided.

What is claimed is:

1. A torque controller for a permanent magnet synchronous motor comprising:
   an electric power converter for driving the permanent magnet synchronous motor;
   a current command calculator for calculating two current command values for a q-axis (torque axis) and a d-axis (magnetic flux axis) based on a torque command value; and
   a vector controller for creating two output voltage command values of the electric power converter for the q-axis and the d-axis based on two differences between the current command value and a detected current value for the q-axis and the d-axis, respectively, to control an output voltage value of the electric power converter;
   wherein when the output voltage value of the electric power converter reaches a prescribed voltage value, an integration is performed on a difference between the prescribed voltage value and the output voltage value of the electric power converter to obtain an integrated value and the integrated value is used to correct a commanded torque value.

2. The torque controller according to claim 1, wherein a gain in the integration is a control response angular frequency to be set in a commanded torque correcting part, the control response angular frequency being about half to one-tenth the control response angular frequency to be set in current control by a vector control calculating part.

3. The torque controller according to claim 1, wherein an upper limit of the integrated value calculated from the difference between the prescribed voltage value and the output voltage value of the electric power converter is restricted to 0, and a lower limit of the integrated value is restricted to a value obtained by multiplying the absolute value of the commanded torque value before the correction by −1.

4. The torque controller according to claim 1, wherein the calculated frequency value is obtained from commanded voltage values for the d-axis and q-axis, and a detected motor current or a reproduced motor current so that a difference calculated from an inferred phase value and a motor phase value becomes 0.

5. A torque controller for a permanent magnet synchronous motor comprising:
   an electric power converter for driving the permanent magnet synchronous motor;
   a current command calculator for calculating two current command values for a q-axis (torque axis) and a d-axis (magnetic flux axis) based on a torque command value; and
   a vector controller for creating two output voltage command values of the electric power converter for the q-axis and the d-axis based on two differences between the current command value and a detected current value for the q-axis and the d-axis, respectively, to control an output voltage value of the electric power converter;
   wherein the torque command value is corrected so that the output voltage of the electric power converter does not exceed a prescribed voltage value; and
   wherein, in correction of the commanded torque value, an integration is performed on a difference between the prescribed voltage value and the output voltage value of the electric power converter to obtain an integrated value, the integrated value is multiplied by a sign of a polarity of the commanded torque value before the correction to obtain a multiplied value, and the multiplied value is added to the commanded torque value before the correction.

6. A torque controller for a permanent magnet synchronous motor comprising:
   an electric power converter for driving the permanent magnet synchronous motor;
   a current command calculator for calculating two current command values for a q-axis (torque axis) and a d-axis (magnetic flux axis) based on a torque command value; and
   a vector controller for creating two output voltage command values of the electric power converter for the q-axis and the d-axis based on two differences between the current command value and a detected current value for the q-axis and the d-axis, respectively, to control an output voltage value of the electric power converter;
   wherein the torque command value is corrected so that the output voltage of the electric power converter does not exceed a prescribed voltage value; and
   wherein, in correction of the commanded torque value, which is denoted $\tau^*$, calculations as in the equations shown below are performed by using the prescribed voltage value, which is denoted $V_{ref}^*$, and the output voltage value of the electric power converter, which is denoted V:

[Equation 1]
$$Ka = \frac{\omega c}{\sqrt{R^{*2} + (\omega_1 \cdot L_q^*)^2}} \quad (3)$$

[Equation 2]
$$\Delta \tau^* = \frac{K}{s} \cdot (V_{ref}^* - V_1) \cdot S_{ign}[\tau_0^*] \quad (6)$$

[Equation 3]
$$\tau^* = \tau_0^* + \Delta \tau^* \quad (7)$$

where $\tau_0^*$ is the command torque value before the correction, $\Delta\tau$ is an amount of torque correction, $\tau^*$ is a commanded torque value after the correction, Ka is an integrated gain, $\omega_1$ is a calculated frequency value, $\omega c$ is a control response angular frequency, R is the resistance of a motor and a harness, Lq is an inductance value, and Sign[$\tau_0$] is ±1.

7. A torque controller for a permanent magnet synchronous motor comprising:
   an electric power converter for driving the permanent magnet synchronous motor;
   a current command calculator for calculating two current command values for a q-axis (torque axis) and a d-axis (magnetic flux axis) based on a torque command value;
   and a vector controller for creating two output voltage command values of the electric power converter for the q-axis and the d-axis based on two differences between the current command value and a detected current value for the q-axis and the d-axis, respectively, to control an output voltage value of the electric power converter;

wherein the torque command value is corrected so that the output voltage of the electric power converter does not exceed a prescribed voltage value;

and wherein the prescribed voltage value is three-fourths or less of a DC voltage supplied to the electric power converter when sine wave modulation is performed on commanded voltage values Vu*, Vv*, and Vw* of a three-phase AC current, which control the electric power converter, or $2/\sqrt{3}$ or less of the DC voltage supplied to the electric power converter when an in-phase signal which is canceled at a line voltage, is superimposed on the commanded voltage values Vu*, Vv*, and Vw* of the three-phase AC current.

* * * * *